United States Patent
Hsieh

(10) Patent No.: US 7,269,331 B2
(45) Date of Patent: Sep. 11, 2007

(54) APPARATUS AND METHOD OF DISPLAYING VIDEO OUTPUT

(75) Inventor: Min Lun Hsieh, Taipei (TW)

(73) Assignee: Ulead Systems, Inc., Taipei (TW)

( * ) Notice: Subject to any disclaimer, the term of this patent is extended or adjusted under 35 U.S.C. 154(b) by 873 days.

(21) Appl. No.: 10/684,367

(22) Filed: Oct. 15, 2003

(65) Prior Publication Data

US 2004/0085304 A1 May 6, 2004

(30) Foreign Application Priority Data

Nov. 5, 2002 (TW) .............................. 91132585 A

(51) Int. Cl.
*H04N 5/94* (2006.01)
(52) U.S. Cl. ...................... 386/47; 386/124; 386/129; 386/95; 386/21
(58) Field of Classification Search .................. 386/95, 386/124, 129, 47, 21
See application file for complete search history.

(56) References Cited

U.S. PATENT DOCUMENTS 4,393,415 A * 7/1983 Hurst .......................... 386/109
4,523,227 A * 6/1985 Hurst .......................... 348/548
5,065,258 A * 11/1991 Warren et al. ............... 386/113
5,105,313 A * 4/1992 Stewart ........................ 386/53

* cited by examiner

*Primary Examiner*—Thai Q. Tran
*Assistant Examiner*—Helen Shibru
(74) *Attorney, Agent, or Firm*—Birch, Stewart, Kolasch & Birch, LLP

(57) ABSTRACT

An apparatus for displaying video output with dynamically adjustable drop rate to control playback quality. The inventive apparatus includes a playback engine, a pre-fetch engine, a rendering engine, and a drawing engine. The playback engine sends a pre-fetch requirement and a playback requirement. The pre-fetch engine receives the pre-fetch requirement, obtains frame data according to the pre-fetch requirement, and stores it in a pre-fetch buffer. The pre-fetch engine also adjusts the drop rate of related conditions of the frame data. The rendering engine obtains frame data, decodes, and filters the frame data. The drawing engine outputs the frame data.

13 Claims, 3 Drawing Sheets

APPARATUS AND METHOD OF DISPLAYING VIDEO OUTPUT

This nonprovisional application claims priority under 35 U.S.C. § 119(a) on Patent Application No. 091132585 filed in TAIWAN on Nov. 5, 2002, which is herein incorporated by reference.

BACKGROUND OF THE INVENTION

1. Field of the Invention

The present invention relates to a video output technology and in particular to an apparatus and method of displaying video output with dynamically adjustable frame rate.

2. Description of the Related Art

The present technology of displaying video output includes three essential components which are the rendering engine, the playback engine, and the drawing engine. The rendering engine processes source frame data. The playback engine controls the display rate. The drawing engine outputs frame data. FIG. 1 is a diagram of the present technology of displaying video output. First, a playback engine 10 sends a frame requirement to a rendering engine 12. The rendering engine 12 then obtains stored source frame data according to the frame requirement. Next, the rendering engine 12 processes the source frame data and sends the processed frame data back to the playback engine 10. Finally, the playback engine 10 sends the processed frame data to a drawing engine 14 to be displayed.

The drawing engine 14 remains idle until the playback engine 10 sends the frame requirement to the rendering engine 12 and the corresponding frame data is processed by the rendering engine 12 and sent to the drawing engine 14 through the playback engine 10. The drawing engine 14 is typically idle for a relatively long time due to the single-thread execution mode, and inefficient use of system resources. Additionally, because the data processing method and the processing time are not controlled, frames are unexpectedly dropped.

Moreover, the present method of processing data required to display video output is based on full size decoding. Full size decoding is time consuming, and lengthens data processing. The present filtering of video output divides a video frame into an odd frame and an even frame, processes the odd and even frame separately, and combines the odd and even frames into an output frame. The mentioned filtering procedure requires more time process data causing a delay in the displayed video output.

SUMMARY OF THE INVENTION

Accordingly, an object of the invention is to provide an apparatus and method of displaying video output applicable to multiple systems. The invention utilizes a multi-thread execution mode for displaying video output, adding a pre-fetch engine and pre-fetch buffer to the present method of displaying video output. The inventive apparatus and method can reduce drawing engine idle time and inefficient use of system resources. The invention adopts the concept of half-size for data decoding and frame-base for data filtering, solving the problem of the present technology.

To achieve the foregoing and other objects, the invention discloses an apparatus and method of displaying video output with dynamically adjustable frame rate to control playback quality. The inventive apparatus includes a playback engine, a pre-fetch engine, a rendering engine, and a drawing engine. The playback engine sends a pre-fetch requirement, a playback requirement, and target frame data. The pre-fetch engine obtains pre-fetch frame data according to the pre-fetch requirement from the pre-fetch buffer and sends the obtained frame data to the playback engine. If the pre-fetch frame data according to the playback requirement is not stored in the pre-fetch buffer, the pre-fetch engine obtains and sends first playback frame data to the playback engine. The pre-fetch engine further receives the pre-fetch requirement, obtains second playback data, storing it in the pre-fetch buffer, and adjusts the drop rate of the first and second playback frame data according to related conditions. The rendering engine obtains stored source frame data, transfers the source frame data into first and second playback frame data by decoding and filtering, and sends the data to the pre-fetch engine. The decoding is half-framed and the filtering is frame-based. The drawing engine receives the playback requirement and the target frame data from the playback engine and outputs the target frame data.

BRIEF DESCRIPTION OF THE DRAWINGS

The present invention can be more fully understood by reading the following detailed description and examples with references made to the accompanying drawings, wherein.

DETAILED DESCRIPTION OF THE INVENTION

Figure 1:
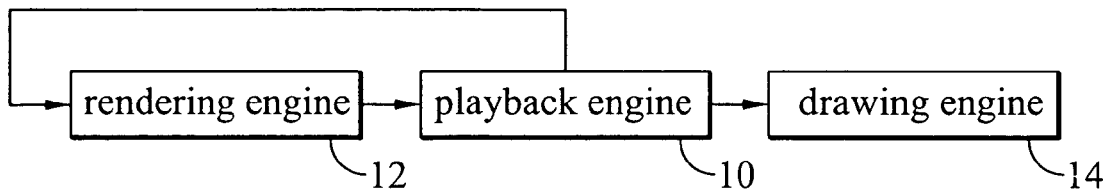
FIG. 1 is a diagram of the present technology of displaying video output.

As summarized above, the present invention discloses an apparatus and method of displaying video output with dynamically adjustable frame rate to control playback quality. The inventive apparatus comprises a playback engine, a pre-fetch engine, a rendering engine, and a drawing engine.

The playback engine sends a pre-fetch requirement, a playback requirement, and target frame data. The playback engine also controls the display rate of video frames and sends the pre-fetch requirement to the pre-fetch engine during idle time.

The pre-fetch engine is coupled to the playback engine and comprises a pre-fetch buffer. The pre-fetch engine receives the playback requirement. The pre-fetch engine obtains pre-fetch frame data from the pre-fetch buffer according to the playback requirement and sends the obtained pre-fetch frame data to the playback engine. If the pre-fetch frame data according to the playback requirement is not stored in the pre-fetch buffer, the pre-fetch engine obtains first playback frame data and sends the obtained first playback frame data to the playback engine.

The pre-fetch engine further receives the pre-fetch requirement, obtains second playback data, and stores it in the pre-fetch buffer. The pre-fetch engine also adjusts the drop rate of the first and second playback frame data according to related conditions. The related conditions comprise video frame processing time, real-time display definition time, and pre-fetch buffer size.

The rendering engine, coupled to the pre-fetch engine, obtains stored source frame data, transfers the source frame data into the first and second playback frame data by decoding and filtering, and sends the processed frame data to the pre-fetch engine. Regarding decoding, the invention utilizes a half-frame as the data processing unit, thus reducing the data processing area by one quarter when compared to the present decoding method. The reduced data processing area greatly reduces processing. Regarding filtering, the invention utilizes a frame-based method to simplify the data processing procedure and also further reduces processing time.

The drawing engine, coupled to the playback engine, receives the playback requirement and the target frame data from the playback engine and outputs the target frame data. The target frame data includes video and audio data. The drawing engine comprises a plug-in output module. The plug-in output module is an independent module attached to the drawing engine for outputting data frames.

The main concept of the invention is to pre-fetch the desired video frames and store the pre-fetched video frames into the pre-fetch buffer during idle time. Thus, the desired display frames can be smoothly displayed because the desired display frames are already stored in the pre-fetch buffer.

Moreover, the invention provides a method of displaying video output with dynamically adjustable frame rate to control playback quality. The method first provides a playback engine, a pre-fetch engine, a rendering engine, and a drawing engine. The pre-fetch engine comprises a pre-fetch buffer. The pre-fetch engine and the drawing engine are capable of multi-thread execution. The drawing engine comprises a plug-in output module, attached to the drawing engine for outputting data frames. The playback engine sends the pre-fetch requirement during idle time.

Next, the playback engine sends a requirement, i.e. a playback requirement or a pre-fetch requirement to the pre-fetch engine. The pre-fetch engine recognizes the received requirement as a playback requirement or a pre-fetch requirement. If the received requirement is a playback requirement, the pre-fetch engine obtains pre-fetch frame data from the pre-fetch buffer according to the playback requirement and sends the obtained frame data to the playback engine. If the frame data according to the playback requirement is not stored in the pre-fetch buffer, the pre-fetch engine sends the playback requirement to the rendering engine.

The rendering engine further obtains first source frame data according to the playback requirement, transfers the first source frame data into first playback frame data by decoding and filtering, and sends the processed first playback frame data to the pre-fetch engine. Here, the decoding and the filtering are half-framed and frame-based respectively, as previously mentioned.

The pre-fetch engine then sends the received first playback frame data to the playback engine and adjusts the frame drop rate according to related conditions of the first playback frame data. The related conditions comprise video frame processing time, real-time display definition time, and pre-fetch buffer size. The video frame processing time affects the drop rate of video frames. The real-time display definition time affects pre-fetching efficiency. The size of the pre-fetch buffer affects the pre-fetch result. Therefore, the three factors should be considered as a whole.

The playback engine transfers the first playback frame data into target frame data and sends the target frame data to the playback engine. The playback engine initiates the plug-in output module to output the target frame data, including video and audio data.

In the beginning, if the pre-fetch engine recognizes the received requirement from the playback engine as a pre-fetch requirement, the pre-fetch engine sends the pre-fetch requirement to the rendering engine. The rendering engine then obtains second source frame data according to the pre-fetch requirement. The rendering engine also transfers the second source frame data into second playback frame data by decoding and filtering. The processed second frame playback data is then sent to the pre-fetch engine.

The pre-fetch engine stores the second playback frame data in the pre-fetch buffer and adjusts the frame drop rate according to related conditions of the second playback frame data. Again, the related conditions comprise frame processing time, real-time display definition time, and the pre-fetch buffer size. All the related conditions should be considered as a whole.

Thus, an apparatus and method of displaying video output with dynamically adjustable frame rate to control playback quality is provided. The invention is capable of multi-thread execution, that is, the pre-fetch engine can execute in parallel with the drawing engine, greatly reducing drawing engine idle time.

Figure 2:
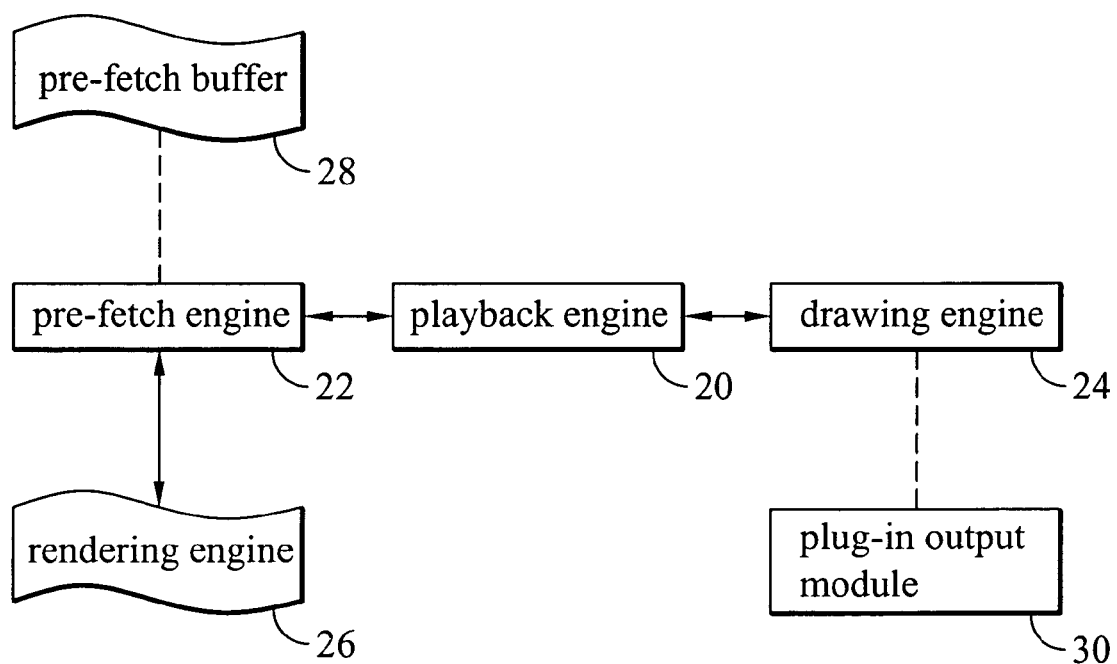
FIG. 2 is a diagram of an apparatus of displaying video output for adjusting drop rate of video frames dynamically to control playback quality.

FIG. 2 is a diagram of an apparatus for displaying video output with dynamically adjustable frame rate to control playback quality. In one embodiment, the inventive apparatus comprises a playback engine 20, a pre-fetch engine 22, a rendering engine 26, and a drawing engine 24.

The playback engine 20 sends a pre-fetch requirement, a playback requirement, and target frame data. The playback engine 20 controls the display rate of video frames and sends the pre-fetch requirement to the pre-fetch engine 22 during idle time.

The pre-fetch engine 22 is coupled to the playback engine 20 and comprises a pre-fetch buffer 28. The pre-fetch engine 22 obtains pre-fetch frame data from the pre-fetch buffer 28 and sends the obtained pre-fetch frame data to the playback engine 20. If the pre-fetch frame data according to the playback requirement is not stored in the pre-fetch buffer 28, the pre-fetch engine 22 obtains and sends first playback frame data to the playback engine 20.

The pre-fetch engine 22 further receives the pre-fetch requirement, obtains second playback data, and stores it in the pre-fetch buffer 28. The pre-fetch engine 22 also adjusts the drop rate of the first and second playback frame data according to related conditions. The related conditions comprise video frame processing time, real-time display definition time, and pre-fetch buffer size.

The rendering engine 26, coupled to the pre-fetch engine 22, obtains stored source frame data, transfers the source frame data into the first and second playback frame data by decoding and filtering, and sends the processed frame data to the pre-fetch engine 22. Regarding decoding and filtering, the invention utilizes half-frame and frame-base as the data processing unit, respectively.

The drawing engine 24, coupled to the playback engine 20, receives the playback requirement and the target frame data from the playback engine 20 and outputs the target frame data. The target frame data includes video and audio data. The drawing engine 24 comprises a plug-in output module 30. The plug-in output module 30 is an independent module attached to the drawing engine 24 for outputting data frames.

Figure 3:
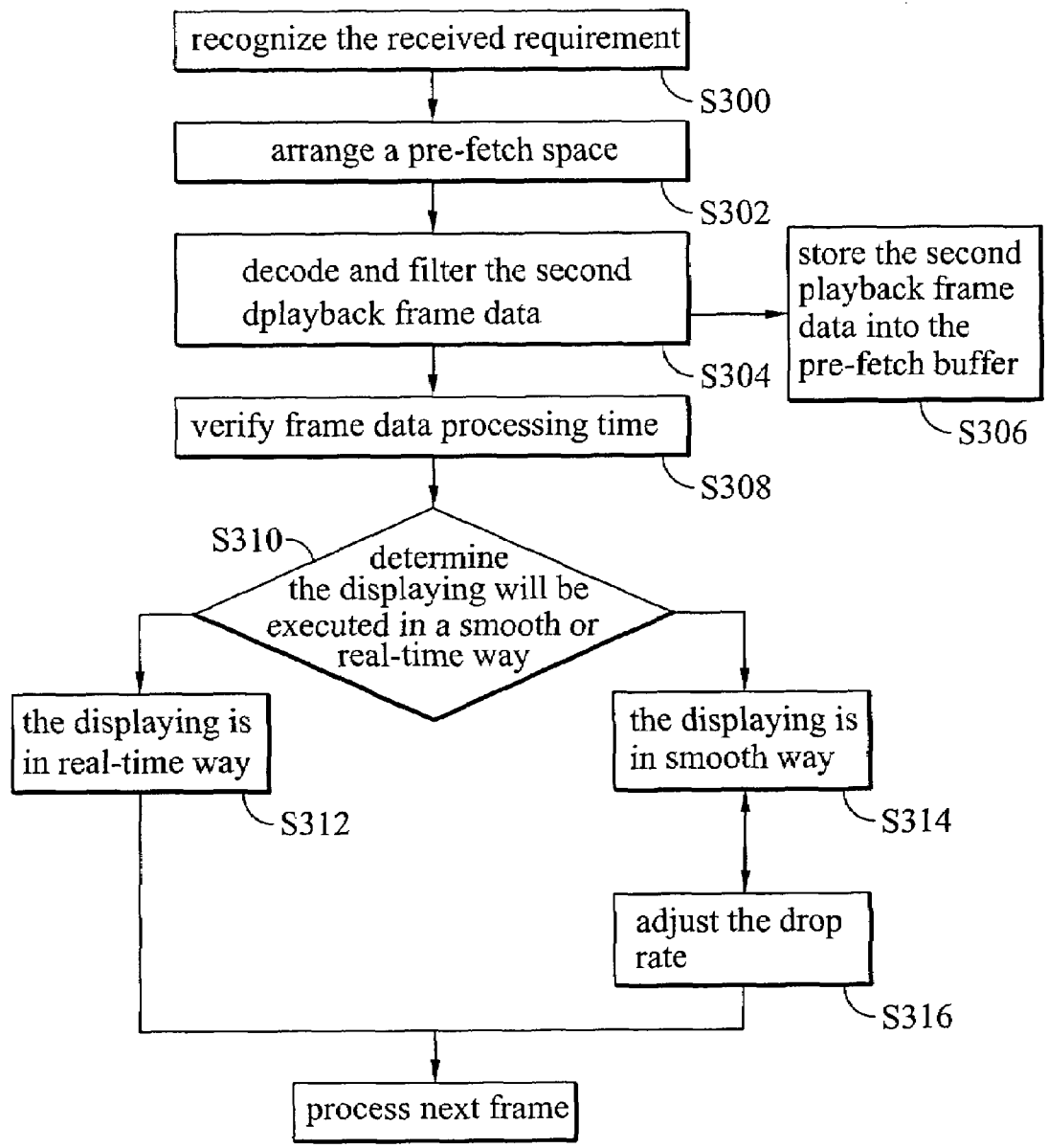
FIG. 3 is a flowchart of pre-fetch video frame data.

FIG. 3 is a flowchart of pre-fetch video frame data. A method of displaying video output with dynamically adjustable frame rate to control playback quality is provided. In one embodiment, the method first provides a playback engine, a pre-fetch engine, a rendering engine, and a drawing engine. The pre-fetch engine comprises a pre-fetch buffer. The pre-fetch engine and the drawing engine are executed in multi-thread. The drawing engine comprises a plug-in output module, attached to the drawing engine for outputting data frames. The playback engine sends the pre-fetch requirement during idle time.

The playback engine sends a requirement, i.e. a playback requirement or a pre-fetch requirement. The pre-fetch engine will recognize the received requirement as a playback requirement or a pre-fetch requirement. If the pre-fetch engine recognizes the received requirement from the playback engine as a pre-fetch requirement (step S300), the pre-fetch engine sends the pre-fetch requirement to the rendering engine and arranges a pre-fetch space (step S302). The rendering engine then obtains second source frame data according to the pre-fetch requirement. The rendering engine transfers the second source frame data into second playback frame data by decoding and filtering (step S304). The processed second playback frame data is sent back to the pre-fetch engine.

The pre-fetch engine stores the second playback frame data into the pre-fetch buffer (step S306). The pre-fetch engine also adjusts frame drop rate according to related conditions of the second playback frame data.

The adjustment is described as follows. First, the pre-fetch engine verifies frame data processing time (step S308). Next, the pre-fetch engine considers frame data processing time, real-time display definition time, and the pre-fetch buffer size to determine the displaying will be executed in a smooth or real-time way (step S310). If the displaying is determined to be real-time (step S312), then the drop rate is not be adjusted. If the displaying is determined to be smooth (step S314), then the drop rate is adjusted (step S316). Finally, the next frame to be displayed is obtained.

Figure 4:
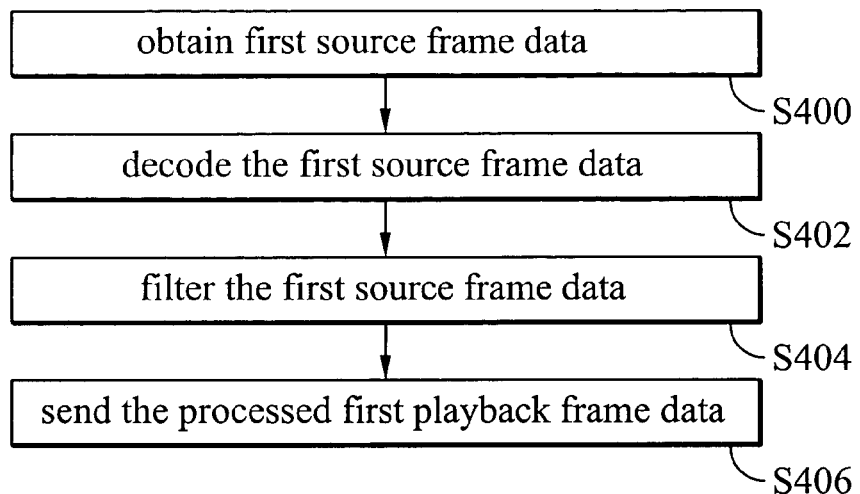
FIG. 4 is a flowchart of video frame data processing.

FIG. 4 is a flowchart of data processing of video frame data. If the received requirement is the playback requirement, the pre-fetch engine obtains and sends pre-fetch frame data according to the playback requirement from the pre-fetch buffer to the playback engine. If the frame data according to the playback requirement is not stored in the pre-fetch buffer, the pre-fetch engine sends the playback requirement to the rendering engine.

The rendering engine obtains first source frame data according to the playback requirement (step S400), transfers the first source frame data into first playback frame data by decoding (step S402) and filtering (step S404), and sends the processed first playback frame data to the pre-fetch engine (step S406).

Figure 5:
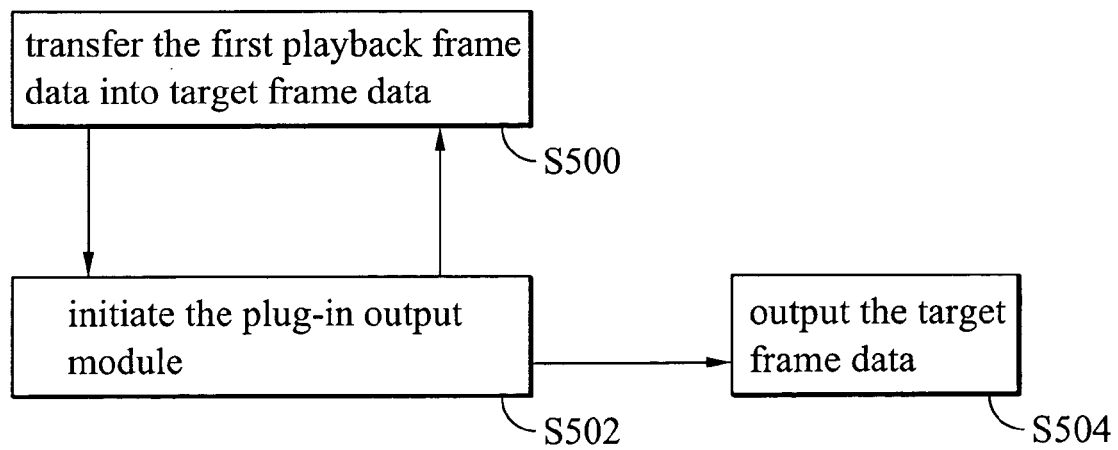
FIG. 5 is a flowchart of displaying video output.

FIG. 5 is a flowchart of video output displaying. The pre-fetch engine then sends the received first playback frame data to the playback engine and adjusts frame drop rate according to related conditions of the first playback frame data. The playback engine transfers the first playback frame data into target frame data and sends the target frames data to the playback engine (step S500). The playback engine initiates the plug-in output module (step S502) to output the target frame data (step S504), including video and audio data.

Thus, an apparatus and method of displaying video output with dynamically adjustable frame rate to control playback quality is provided. The inventive apparatus and method utilizes a multi-thread execution mode to pre-fetch display frame data and adjust display drop rate to reduce system idle time, enhancing smoothness of display. Specifically, the invention can be applied to different display systems, achieving the objects of the invention.

It will be appreciated from the foregoing description that the apparatus and method described herein provide a dynamic and robust solution to the video output displaying problem. If, for example, the data processing method or displaying method is altered, the apparatus and method of the present invention can be revised accordingly.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video output display apparatus for dynamically adjusting video frame to control playback quality, comprising:
   a playback engine, sending a pre-fetch requirement, a playback requirement, and target frame data;
   a pre-fetch engine, coupled to the playback engine and comprising a pre-fetch buffer, the pre-fetch engine obtaining pre-fetch frame data from the pre-fetch buffer according to the playback requirement and sending it to the playback engine, if the pre-fetch frame data according to the playback requirement is not stored in the pre-fetch buffer, the pre-fetch engine obtains first playback frame data and sends it to the playback engine, the pre-fetch engine further receiving the pre-fetch requirement, obtaining second playback data, storing it to the pre-fetch buffer, and adjusting the drop rate of the first and second playback frame data according to related conditions;
   a rendering engine, coupled to the pre-fetch engine, obtaining source frame data, transferring the source frame data into the first and second playback frame data by decoding and filtering, and sending it to the pre-fetch engine, wherein the decoding is half-frame and the filtering is frame-based; and
   a drawing engine, coupled to the playback engine, receiving the playback requirement and the target frame data from the playback engine and outputting the target frame data.

2. The apparatus as claimed in claim 1, wherein the related conditions comprise video frame processing time, real-time display definition time, and the pre-fetch buffer size.

3. The apparatus as claimed in claim 1, wherein the pre-fetch engine and the drawing engine are executed in multi-thread.

4. The apparatus as claimed in claim 1, wherein the drawing engine comprises a plug-in output module, attached to the drawing engine for outputting frame data.

5. The apparatus as claimed in claim 1, wherein the playback engine sends the pre-fetch requirement during idle time.

6. The apparatus as claimed in claim 1, wherein the target frame data comprises video and audio data.

7. A method of displaying video output with dynamically adjustable frame rate to control playback quality, comprising the steps of:
   (a) providing a playback engine, a pre-fetch engine, a rendering engine, and a drawing engine, wherein the pre-fetch engine comprises a pre-fetch buffer and the drawing engine comprises a plug-in output module;

(b) the playback engine sending a playback requirement and a pre-fetch requirement;
(c) the pre-fetch engine recognizing the playback requirement, obtaining pre-fetch frame data from the pre-fetch buffer, and sending it to the playback engine;
(d) the pre-fetch engine sending the playback frame requirement to the rendering engine if the pre-fetch frame data is not stored in the pre-fetch buffer;
(e) the rendering engine obtaining first source frame data according to the playback requirement, transferring the first source frame data into first playback frame data by decoding and filtering, and sending it to the pre-fetch engine;
(f) the pre-fetch engine sending the received first playback frame data to the playback engine and adjusting the frame drop rate according to related conditions of the first playback frame data;
(g) the playback engine transferring the first playback frame data into target frame data and sending it to the drawing engine;
(h) the drawing engine initiating the plug-in output module to output the target frame data;
(i) in step (c), the pre-fetch engine recognizing the received pre-fetch requirement, and sends the pre-fetch requirement to the rendering engine;
(j) the rendering engine obtaining second source frame data according to the pre-fetch requirement, transferring the second source frame data into second playback frame data by decoding and filtering, and sending it to the pre-fetch engine; and
(k) the pre-fetch engine storing the second playback frame data into the pre-fetch buffer and adjusting frame drop rate according to related conditions of the second playback frame data.

8. The method as claimed in claim 7, wherein in steps (f) and (k), the related conditions comprise processing time of video frames, definition time of real-time display, and pre-fetch buffer size.

9. The method as claimed in claim 7, wherein the pre-fetch engine and the drawing engine are capable of multi-thread execution.

10. The method as claimed in claim 7, wherein in the (a) step, the drawing engine comprises a plug-in output module, attached to the drawing engine for outputting data frames.

11. The method as claimed in claim 7, wherein in the steps (e) and (j), the decoding is half-framed and the filtering is frame-based.

12. The method as claimed in claim 7, wherein in step (b), the playback engine sends the pre-fetch requirement during idle time.

13. The method as claimed in claim 7, wherein in step (g), the target frame data comprises video and audio data.

* * * * *